US008494562B2

(12) United States Patent
Kim et al.

(10) Patent No.: US 8,494,562 B2
(45) Date of Patent: Jul. 23, 2013

(54) METHOD OF PROVIDING LOCATION INFORMATION IN WIRELESS COMMUNICATION SYSTEM

(75) Inventors: Eunkyung Kim, Seoul (KR); Jae Sun Cha, Daejeon-si (KR); Juhee Kim, Daejeon-si (KR); Soojung Jung, Daejeon-si (KR); Hyun Lee, Daejeon-si (KR); Kwang Jae Lim, Daejeon-si (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 280 days.

(21) Appl. No.: 12/870,323

(22) Filed: Aug. 27, 2010

(65) Prior Publication Data

US 2011/0059755 A1    Mar. 10, 2011

(30) Foreign Application Priority Data

Aug. 28, 2009  (KR) ................. 10-2009-0080797
Aug. 27, 2010  (KR) ................. 10-2010-0083235

(51) Int. Cl.
*H04W 24/00*  (2009.01)
(52) U.S. Cl.
USPC ............... 455/456.3; 455/456.1; 455/456.2; 455/404.2; 455/456.4

(58) Field of Classification Search
USPC ......... 455/456.1, 456.2, 456.3, 404.2, 456.4, 455/456.5, 456.6
See application file for complete search history.

(56) References Cited

U.S. PATENT DOCUMENTS

2002/0077116 A1* 6/2002 Havinis et al. ............... 455/456
2009/0098857 A1* 4/2009 De Atley ..................... 455/411
2009/0154386 A1  6/2009 So et al.

FOREIGN PATENT DOCUMENTS

EP   1 549 095      6/2005
KR   10-2005-0023088   3/2005

* cited by examiner

*Primary Examiner* — Kathy Wang-Hurst
(74) *Attorney, Agent, or Firm* — Staas & Halsey LLP (57) ABSTRACT

A method of providing location information in a wireless communication system includes receiving a location information request message, including Location Based Service (LBS) control information, from a Base Station (BS), the LBS control information being information about a condition in which location information is reported, performing LBS measurement, and if the condition is satisfied, transmitting a location information response message, including location information collected through the LBS measurement, to the BS. In accordance with the present invention, in a wireless access system supporting LBS, LBS-related information can be reported irrespective of the state of a User Equipment (UE). In particular, in the case in which a UE is in an idle state, location information can be provided efficiently and rapidly.

11 Claims, 5 Drawing Sheets

METHOD OF PROVIDING LOCATION INFORMATION IN WIRELESS COMMUNICATION SYSTEM

This application claims the benefit of priority of Korean Patent Application No. 10-2009-0080797 filed on Aug. 28, 2009 and Korean Patent Application No. 10-2010-0083235 filed on Aug. 27, 2010, which are incorporated by reference in their entirety herein.

BACKGROUND OF THE INVENTION

1. Field of the Invention

The present invention relates to a method of efficiently reporting location technology in a mobile wireless access system supporting location-based service between a mobile terminal and a base station.

2. Related Art

With an increase of users who want to transmit and receive data while moving, Location Based Service (LBS) is recently emerging as one of the major services in the field of mobile communication. The LBS is service for providing various pieces of information pertinent to the location of a user while moving to the user rapidly and conveniently through wireless and wired communications. Not only IEEE 802.16m, but also various communication standards pertinent to the LBS have been established. The LBS is called LoCation Service (LCS) in the 3rd Generation Partnership Project (3GPP) and called Mobile Location Service (MLS) in Open Mobile Alliance (OMA).

In order to provide the LBS, wireless location technology is required. The wireless location technology includes a method using a satellite signal depending on a signal for the location, a method using a mobile communication signal, and a hybrid scheme using the two methods. Meanwhile, the wireless location technology is divided into a mobile-based mode in which the final location is determined or confirmed by a mobile terminal and a mobile-assisted mode in which the final location is determined or confirmed in a network, depending on the subject which determines the final location.

The method using a satellite signal is the same technology as a Global Positioning System (GPS), and currently commercialized technologies can include GPS location technology using a GPS satellite network by U.S.A.

The method using a mobile communication signal includes a method of measuring Timing of Arrival (TOA) between a mobile terminal and a base station, a method of measuring Time Difference of Arrival (TDOA) from two different base stations, and a method of a mobile terminal measuring the Direction of Arrival (DOA) or the Angle of Arrival (AOA) of a signal.

A mobile terminal reports location information, such as TDOA information and TOA information, to a base station using wireless location technology used by the base station. The base station measures the location of the mobile terminal on the basis of the location information reported by the mobile terminal. Here, the method of a mobile terminal reporting location information includes a method of reporting location information after a lapse of some time and a method of reporting location information when a base station requests the location information. However, in the two methods, unnecessary reports are generated when the move speed of a mobile terminal is slow or when a mobile terminal is in an idle mode. Accordingly, there is a need for a method of providing LBS when a mobile terminal is in a connected state or an idle state while reducing overhead.

SUMMARY OF THE INVENTION

It is, therefore, an object of the present invention to efficiently provide LBS irrespective of the state of a user equipment in the case where the LBS is sought to be provided to the user equipment. In particular, an object of the present invention is to increase efficiency by performing a report using an LBS-REP message upon paging when a user equipment is in an idle state.

In accordance with an aspect of the present invention, there is provided a method of providing location information in a wireless communication system, including receiving a location information request message, including Location Based Service (LBS) control information, from a Base Station (BS), the LBS control information being information about a condition in which location information is reported, performing LBS measurement, and if the condition is satisfied, transmitting a location information response message, including location information collected through the LBS measurement, to the BS.

The LBS control information includes a threshold, and the condition corresponds to a case in which a difference between location information at a past time and location information at a current time, of a User Equipment (UE), is greater than or equal to the threshold.

The LBS control information includes a timer, and the condition corresponds to a case in which a timer expires.

The format of the location information request message is determined depending on a state of a UE.

In case where the state of the UE is in a connected state, the location information request message is an LBS-REQ message.

In case where the state of the UE is in an idle state, the location information request message is a ranging response message.

In case where the state of the UE is in an idle state, the location information request message is a paging advertisement message.

The collected location information includes any one of Time Difference of Arrival (TDOA), Direction of Arrival (DOA), Angle of Arrival (AOA), and Time of Arrival (TOA).

The collected location information includes any one of a Carrier to Interference Noise Ratio (CINR), a Received Signal Strength Indication (RSSI), Relative Delay (RD), and Round Trip Delay (RTD).

In accordance with another aspect of the present invention, there is provided a method of determining a location of a UE in a wireless communication system, including transmitting a location information request message, including LBS control information, to the UE, the LBS control information being information about a condition in which location information is reported, if the condition is satisfied, receiving a location information response message, including location information collected through LBS measurement, from the UE, and determining the location of the UE on the basis of the collected location information.

The LBS control information includes a type of a wireless location method of determining the location of the UE, and the collected location information is different according to the type.

In case where the UE is in an idle state, the method of determining the location of the UE is performed using a paging or ranging procedure, and the location information request message and the location information response message are paging-related messages used in a paging procedure.

The location information request message is a ranging response message or a paging advertisement message.

In accordance with the present invention, in a wireless access system supporting LBS, LBS-related information can be reported irrespective of the state of a User Equipment (UE). In particular, in the case in which a UE is in an idle state, location information can be provided efficiently and rapidly.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). The CDMA system can be implemented using radio technology, such as Universal Terrestrial Radio Access (UTRA) or CDMA2000. The TDMA system can be implemented using radio technology, such as Global System for Mobile communications (GSM), General Packet Radio Service (GPRS), or Enhanced Data Rates for GSM Evolution (EDGE). The OFDMA system can be implemented using radio technology, such as IEEE (Institute of Electrical and Electronics Engineers) 802.11 (Wi-Fi), IEEE 802.16 (WiMAX), IEEE 802-20, or Evolved UTRA (E-UTRA). The UTRA is part of a Universal Mobile Telecommunications System (UMTS). $3^{rd}$ Generation Partnership Project (3GPP) Long Term Evolution (LTE) is part of Evolved UTMS (E-UMTS) using Evolved-UMTS Terrestrial Radio Access (E-UTRA). The 3GPP LTE adopts OFDMA in downlink and SC-FDMA in uplink.

Figure 1:
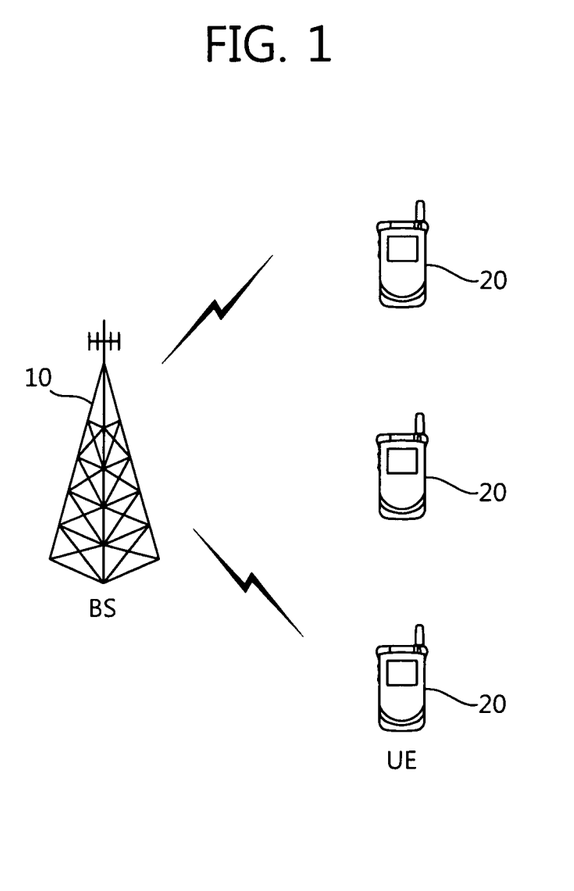
FIG. 1 is a diagram showing a wireless communication system.

FIG. 1 is a diagram showing a wireless communication system. The wireless communication systems are widely deployed in order to provide a variety of communication services, such as voice and packet data.

Referring to FIG. 1, the wireless communication system includes User Equipments (UEs) 20 and a Base Station (BS) 10. In general, the BS 10 refers to a fixed station which communicates with the UEs 20, and it can be referred to as another terminology, such as an Advanced Base Station (ABS), a Node-B, a Base Transceiver System (BTS), or an access point. One or more cells can exist in one BS 10. The UE 20 can be fixed or mobile and referred to as another terminology, such as a Mobile Station (MS), an Advanced Mobile Station (AMS), a User Terminal (UT), a Subscriber Station (SS), or a wireless device.

Hereinafter, downlink (DL) refers to communication from the BS 10 to the UE 20, and uplink (UL) refers to communication from the UE 20 to the BS 10. In downlink, a transmitter can be part of the BS 10, and a receiver can be part of the UE 20. In uplink, a transmitter can be part of the UE 20, and a receiver can be part of the BS 10. The BS 10 performs communication with the UE 20 using radio resources of a downlink frame. The UE 20 performs communication with the BS 10 using radio resources of an uplink frame.

Figure 2:
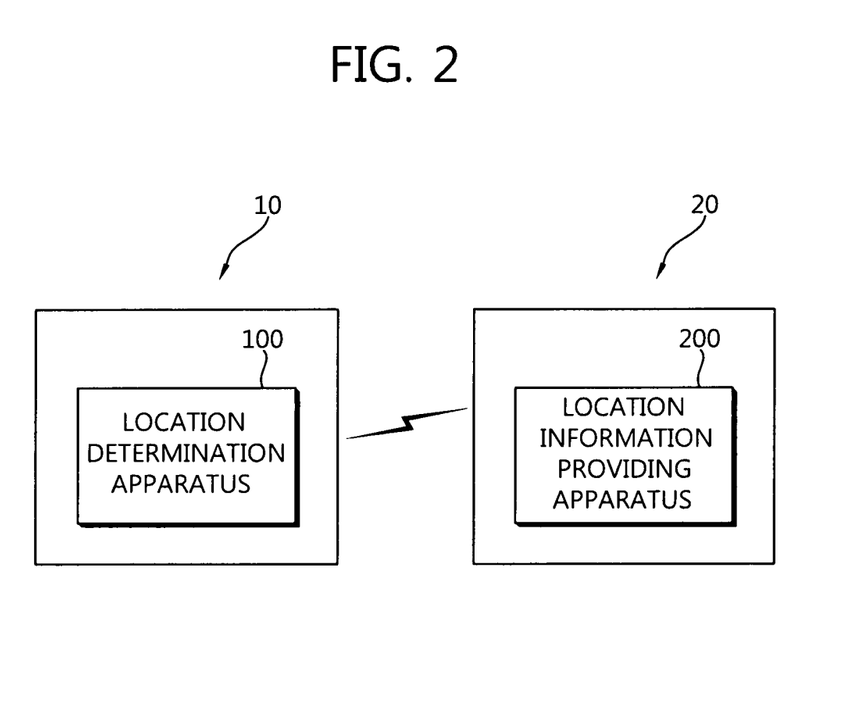
FIG. 2 is a block diagram showing a UE and a BS according to an embodiment of the present invention.

FIG. 2 is a block diagram showing a UE and a BS according to an embodiment of the present invention.

Referring to FIG. 2, the UE 20 can have the mobile-based mode and the mobile-assisted mode as a location mode. In the mobile-based mode, the final location is determined or confirmed by the UE 20. In the mobile-assisted mode, the final location is determined or confirmed by the BS 10. The UE 20 operating in the mobile-assisted mode reports information about its frequently changing location to the BS 10.

The BS 10 includes a location determination apparatus 100, and the UE 20 includes a location information providing apparatus 200.

First, the location determination apparatus 100 determines a wireless location method. The determined wireless location method can include a method of measuring Timing of Arrival (TOA) between a UE and a BS, a method of measuring Time Difference of Arrival (TDOA) from two different BSs, or a method of a UE measuring the Direction of Arrival (DOA) or Angle of Arrival (AOA) of a signal.

After the wireless location method is determined, the location determination apparatus 100 transmits a location information request message, including an indicator indicative of the determined wireless location method and an indicator indicative of location measurement parameters necessary for the determined wireless location method, to the location information providing apparatus 200. Accordingly, the process of the location determination apparatus 100 requesting location information is completed.

The location information providing apparatus 200 determines which wireless location method is being used on the basis of the indicator indicating the wireless location method. Next, the location information providing apparatus 200 collects location information (e.g., TODA information in the case of the method of measuring TDOA), corresponding to the location measurement parameters, and reports a location information response message, including location information collected whenever a report condition on the location information is satisfied, to the location determination apparatus 100.

When the location determination apparatus 100 receives the location information response message from the location information providing apparatus 200, it determines the final location of the UE 20 on the basis of the location information.

Figure 3:
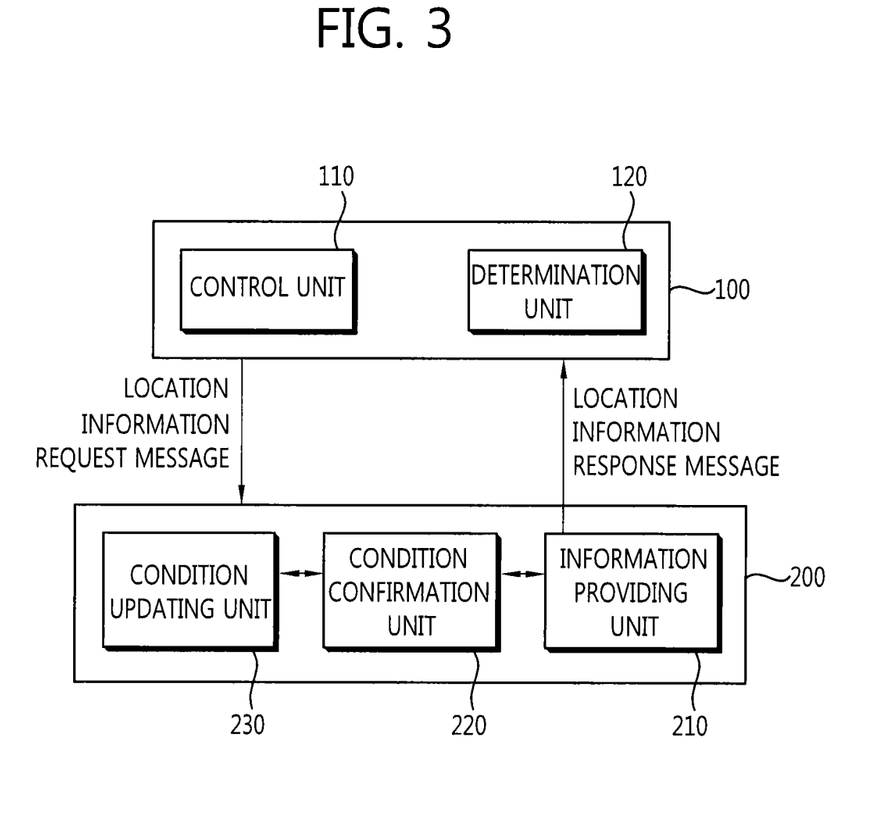
FIG. 3 is a block diagram showing the location determination apparatus and the location information providing apparatus according to an embodiment of the present invention.

FIG. 3 is a block diagram showing the location determination apparatus and the location information providing apparatus according to an embodiment of the present invention. FIG. 3 shows an example in which a UE is in the connected state.

Referring to FIG. 3, the location determination apparatus 100 includes a control unit 110 and a determination unit 120. The control unit 110 determines whether to use a GPS-based location method, a BS-based location method, or which detailed method in the BS-based location method because parameters being used are different depending on a wireless location method. The above wireless location method is called an LBS type. Next, the control unit 110 generates a location information request message, including the determined LBS type and LBS control information. The location determination apparatus 100 transmits the location information request message to the location information providing apparatus 200. The LBS control information includes information about a mode for informing the report start, end, change, etc. of location information, a metric for a location according to a corresponding mode, a timer, and a threshold according to a difference between past time information and current time information.

The location information providing apparatus 200 includes an information providing unit 210, a condition confirmation unit 220, and a condition updating unit 230.

The information providing unit 210 transmits a location information response message to the location determination apparatus 100 in response to the location information request message. The location information response message can include longitude, latitude, and an altitude in the case of the GPS-based location method and include a Carrier to Interference Noise Ratio (CINR), Received Signal Strength Indication (RSSI), Relative Delay (RD), Round Trip Delay (RTD), Time of Arrival (TOA), and an Angle in the case of the BS-based location method. A condition that the information providing unit 210 transmits the location information response message is determined by the condition confirmation unit 220. If the condition confirmation unit 220 determines that the condition has been satisfied, the information providing unit 210 can transmit the location information response message.

The condition confirmation unit 220 compares a specific threshold and a difference between a location at a past time and a location at a current time and determines whether the report condition has been satisfied on the basis of the location measurement parameters, such as a report start, end, and change, and a timer. If, as a result of the determination, the difference is greater than or equal to the specific threshold, the condition confirmation unit 220 controls the information providing unit 210 so that it can transmit the location information response message. If the difference is greater than or equal to the specific threshold, it means that location information has been greatly changed. Accordingly, the location determination apparatus 100 must be informed of such a change in order to update the location information.

If, as a result of the determination, the difference is smaller than the specific threshold, the condition confirmation unit 220 repeats the comparison until the difference is greater than or equal to the specific threshold. In an alternative, the condition confirmation unit 220 may determine the report condition using a timer. For example, if a timer is reached, the condition confirmation unit 220 can determine that the report condition has been satisfied.

In case where location measurement parameters are changed, the condition updating unit 230 updates the existing location measurement parameters into the changed location measurement parameters and controls the condition confirmation unit 220 so that the condition confirmation unit 220 provides the location information on the basis of the updated location measurement parameters.

The location information request message and the location information response message can have various form. For example, they can be transmitted in the form of an MAC header, a control channel, or an MAC management message.

LBS must be provided irrespective of the state of a UE whether the state is in the connected state or the idle state. To this end, a report on LBS-related information for each state must be taken into consideration. Accordingly, the location information request message and the location information response message can have a different form depending on whether a UE is currently in the connected state or the idle state.

For example, in the case in which a UE is currently in the connected state, the location information request message can be an LBS-REQ message and the location information response message can be an LBS-REP message. The LBS-REQ message and the LBS-REP message are used for only LBS. For another example, in the case in which a UE is currently in the idle state, the location information request message can be a paging advertisement message or a ranging response message which is pertinent to paging. Further, the location information response message can use the LBS-REP message or other paging-related message. This is for the purpose of preventing overhead which can occur when an additional location information request message is used in order to request location information, in the case in which a UE is in the idle state.

As described above, the location information request message and the location information response message are differently named depending on the state of a UE. Hereinafter, different terms are used for the location information request message and the location information response message depending on the state of each UE.

Figure 4:
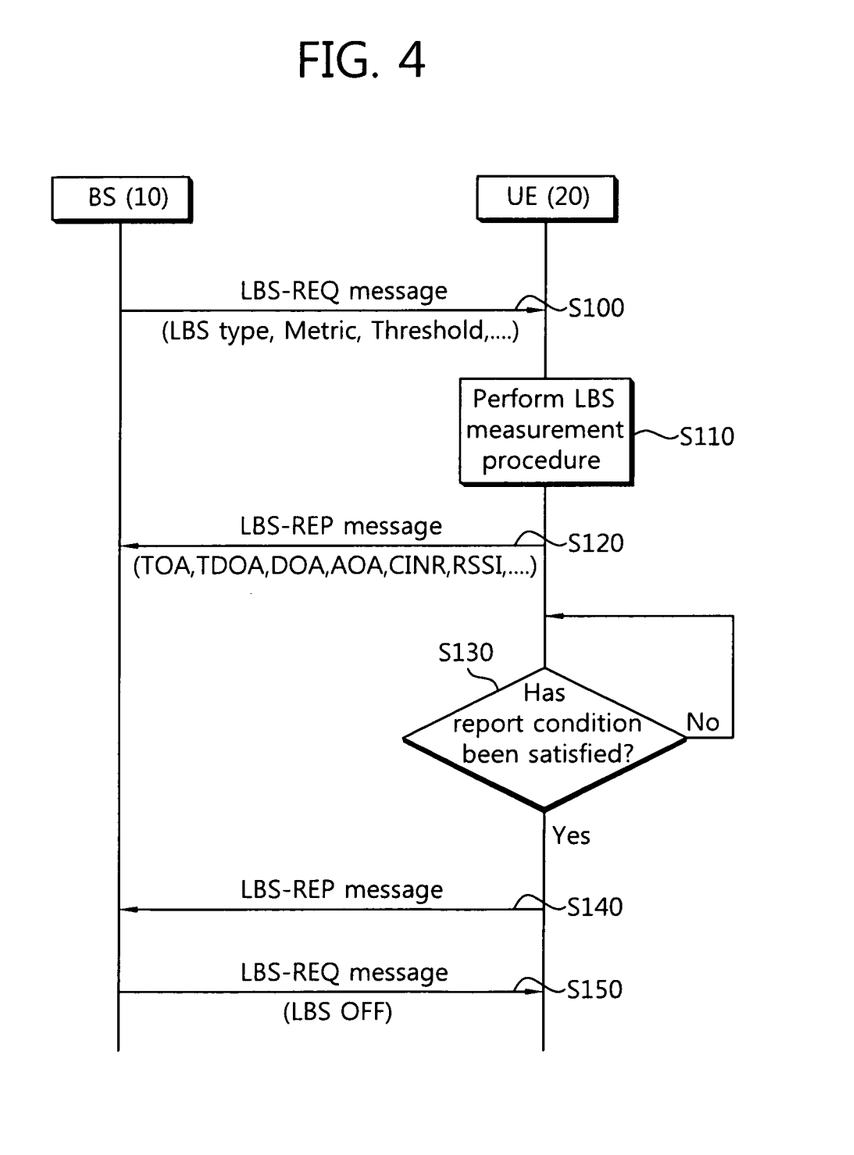
FIG. 4 is a flowchart illustrating a method of providing location information according to an embodiment of the present invention.

FIG. 4 is a flowchart illustrating a method of providing location information according to an embodiment of the present invention. This drawing illustrates a case in which a UE is currently in the connected state. Accordingly, a location information request message is an LBS-REQ message.

Referring to FIG. 4, a BS 10 transmits the LBS-REQ message to the UE 20 at step S100. The LBS-REQ message includes LBS control information, such as an LBS type indicator, a metric, a timer, and a threshold. The UE 20 performs an LBS measurement procedure at step S110. Location information is collected through the LBS measurement procedure. The collected location information can include TOA, TDOA, DOA, AOA, CINR, RSSI, RD, RTD, etc.

The UE 20 transmits an LBS-REP message, including the collected location information, to the BS 10 in response to the LBS-REQ message at step S120. Next, the UE 20 calculates a difference between a location at a past time and a location at a current time as the UE moves and voluntarily determines whether a report condition has been satisfied by comparing the difference and a threshold at step S130. If, as a result of the determination, the difference is greater than or equal to the threshold, it means that the report condition has been satisfied. Accordingly, the UE 20 voluntarily transmits an LBS-REP message, including location information according the location at the current time, to the BS 10 at step S140. The BS 10 transmits an LBS-REQ message, including an LBS off indicator indicative of the end of the LBS, to the UE 20 at step S150. In response thereto, the UE 20 ends the LBS measurement procedure.

However, if, as a result of the determination, the difference is smaller than the threshold, it means that the report condition has not been satisfied. Accordingly, the UE 20 newly collects location information under a certain condition and compares the difference and the threshold at step S130.

As described above, the UE 20 transmits an LBS-REP message in response to an LBS-REQ message received from the BS 10. If a location of the UE 20 is changed, the UE 20 can voluntarily determine a report condition and send a new LBS-REP message, thus providing its location information.

Figure 5:
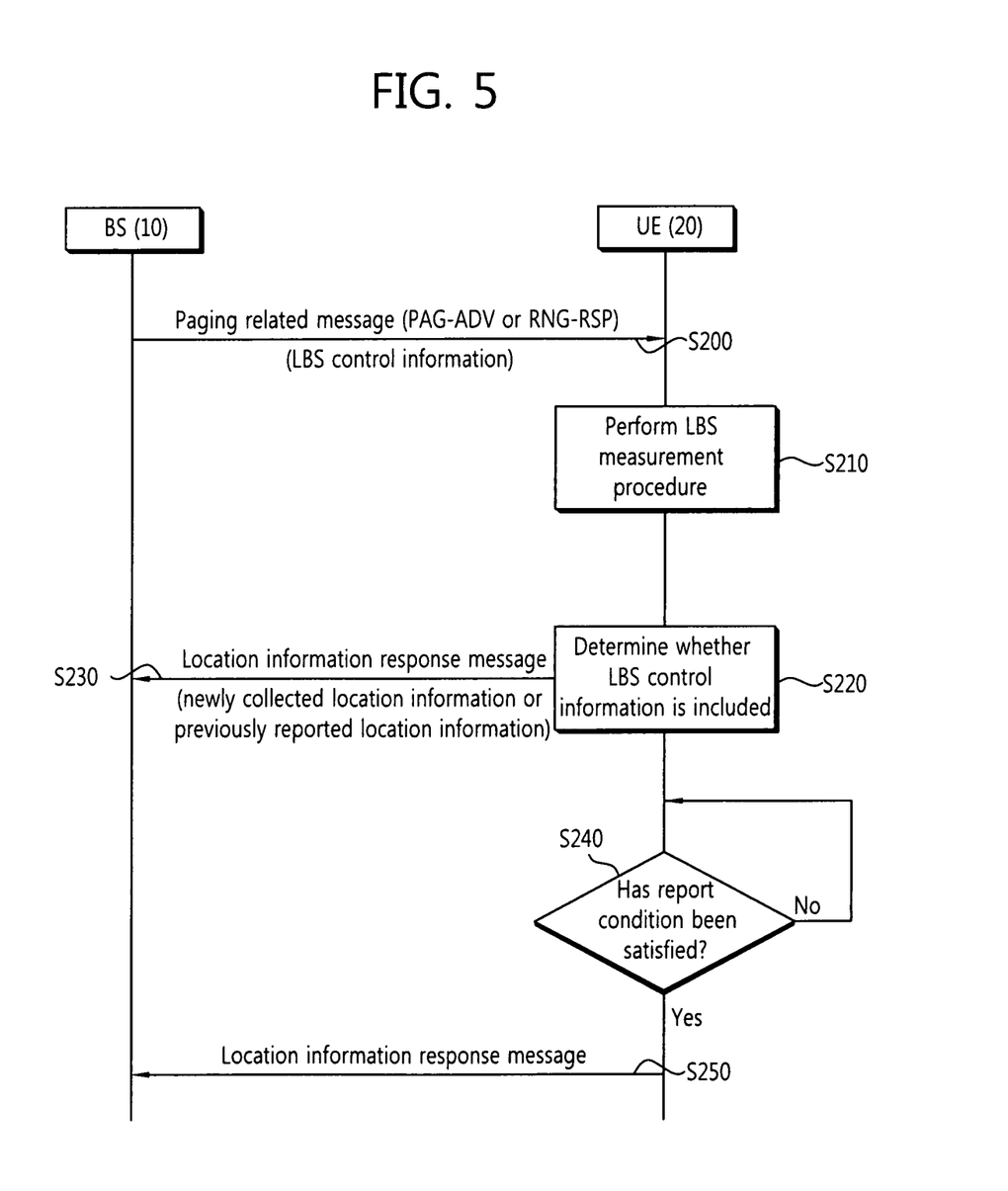
FIG. 5 is a flowchart illustrating a method of providing location information according to another embodiment of the present invention.

FIG. 5 is a flowchart illustrating a method of providing location information according to another embodiment of the present invention. This drawing illustrates a case in which a UE is currently in the idle state. The BS performs a location information request using a paging-related message (e.g., a paging advertisement message or a ranging response message). That is, an additional location information request message is not used, and LBS control information is included in the paging-related message and transmitted.

Referring to FIG. 5, the BS 10 transmits the paging-related message to the UE 20 in order to request location information at step 200. Here, the paging-related message can be a ranging response message RNG-RSP or a paging advertisement message PAG-ADV. The UE 20 collects the location information by performing an LBS measurement procedure at step S210.

For example, in the case in which the UE 20 has transmitted a ranging request message, the BS 10 transmits a ranging response message and includes not only a response message for the ranging, but also LBS control information in the ranging response message. That is, an additional LBS related message is not used. Accordingly, the UE 20 can perform a ranging procedure and an LBS measurement/report procedure at a time. Here, the ranging request message is set to indicate that a ranging purpose indicator is for the purpose of LBS measurement.

For another example, in the case in which the BS 10 transmits a paging advertisement message to the UE 20 in order to obtain location information, the BS 10 includes LBS control information in addition to information about the paging purpose in the paging advertisement message. Accordingly, the UE 20 which has received the LBS control information included in the paging advertisement message can perform not only a paging procedure, but also an LBS measurement/report procedure.

For example, the LBS control information can include information about longitude, latitude, and an altitude in the case of a GPS-based location method and can include CINR, RSSI, RD, RTD, ToA, and an angle in the case of a BS-based location method. The LBS control information can also include a preferred time for a next paging time. The preferred time is calculated by the BS 10, which informs the UE 20 of the preferred time. Although the UE 20 has not received a paging request message from the BS 10 on the basis of a preferred time, the UE 20 can voluntarily perform paging.

For another example, the LBS control information may also include not only a preferred time, but a threshold. Accordingly, although there is no paging request made by the BS 10, the UE 20 can voluntarily determine whether to perform paging for an LBS report by comparing a threshold and a difference between location information about a past time and location information about a current time.

The preferred time and the threshold may also be transmitted by the BS 10 or may be voluntarily determined by the UE 20. When the preferred time determined by the UE 20 is transmitted to the BS 10, the BS 10 can determine a point of time at which a next paging will be performed on the basis of the corresponding preferred time.

For yet another example, the LBS control information may include or not include an indicator or an action code indicative of paging for LBS measurement, information to instruct the initiation of a report for the corresponding LBS measurement, a change of a parameter included in a location information response message, and information to instruct the end of the corresponding report. Accordingly, the UE 20 first determines whether the LBS control information is included in the paging-related message at step S220. If, as a result of the determination, the LBS control information is included in the paging-related message, the UE 20 transmits a location information response message, including the collected location information, to the BS 10 on the basis of the LBS control information. If, as a result of the determination, the LBS control information is not included in the paging-related message, the UE 20 transmits previously reported location information to the BS 10 at step S230.

Meanwhile, the UE 20 determines whether a report condition according to the LBS control information is satisfied at step S240. If, as a result of the determination, the report condition according to the LBS control information is satisfied (e.g., if a difference between location information about a past time and location information about a current time is greater than or equal to a threshold by comparing the threshold and the difference), the UE 20 transmits a new location information response message to the BS 10 at step S250. For example, even after a preferred time has elapsed, the UE 20 transmits a new location information response message to the BS 10 at step S250. However, if, as a result of the determination, the report condition according to the LBS control information is not satisfied, the UE 20 does not transmit a location information response message and repeatedly determine whether the report condition is satisfied until the report condition is satisfied at step S240.

In accordance with the present invention, in a wireless access system supporting LBS, LBS-related information can be reported irrespective of the state of a UE. In particular, in the case in which a UE is in an idle state, location information can be provided efficiently and rapidly.

While the invention has been shown and described with respect to the preferred embodiments, it will be understood by those skilled in the art that various changes and modifications may be made without departing from the spirit and scope of the invention as defined in the following claims.

What is claimed is:

1. A method of providing location information in a wireless communication system, the method comprising:
   receiving a location information request message, including Location Based Service (LBS) control information, from a Base Station (BS), the LBS control information being information about a location constraint condition in which location information is reported, wherein a format of the location information request message is determined depending on a state of a User Equipment (UE), wherein in case where the state of the UE is in a connected state, the location information request message is an LBS-REQ message;
   performing LBS measurement; and
   transmitting a location information response message which includes location information collected through the LBS measurement, to the BS, if the condition is satisfied.

2. The method of claim 1, wherein:
   the LBS control information includes a threshold, and
   the condition corresponds to a case in which a difference between location information at a past time and location information at a current time, of a User Equipment (UE), is greater than or equal to the threshold.

3. The method of claim 1, wherein:
   the LBS control information includes a timer, and
   the condition corresponds to a case in which the timer expires.

4. The method of claim 1, wherein in case where the state of the UE is in an idle state, the location information request message is a ranging response message.

5. The method of claim 1, wherein in case where the state of the UE is in an idle state, the location information request message is a paging advertisement message.

6. The method of claim 1, wherein the collected location information includes any one of Time Difference of Arrival (TDOA), Direction of Arrival (DOA), Angle of Arrival (AOA), and Time of Arrival (TOA).

7. The method of claim 1, wherein the collected location information includes any one of a Carrier to Interference Noise Ratio (CINR), a Received Signal Strength Indication (RSSI), Relative Delay (RD), and Round Trip Delay (RTD).

8. A method of determining a location of a User Equipment (UE) in a wireless communication system, the method comprising:

transmitting a location information request message, including LBS control information, to the UE, the LBS control information being information about a location constraint condition in which location information is reported, wherein a format of the location information request message is determined depending on a state of the UE, wherein in case where the state of the UE is in a connected state, the location information request message is an LBS-REQ message;

receiving a location information response message, including location information collected through LBS measurement, from the UE, if the location constraint condition is satisfied; and determining the location of the UE on the basis of the collected location information.

9. The method of claim 8, wherein:

the LBS control information includes a type of a wireless location method of determining the location of the UE, and the collected location information is different according to the type.

10. The method of claim 8, wherein:

in case where the UE is in an idle state, the determining the location of the UE is performed using a paging or ranging procedure, and the location information request message and the location information response message are paging-related messages used in a paging procedure.

11. The method of claim 10, wherein the location information request message is a ranging response message or a paging advertisement message.

* * * * *